Figure 1:
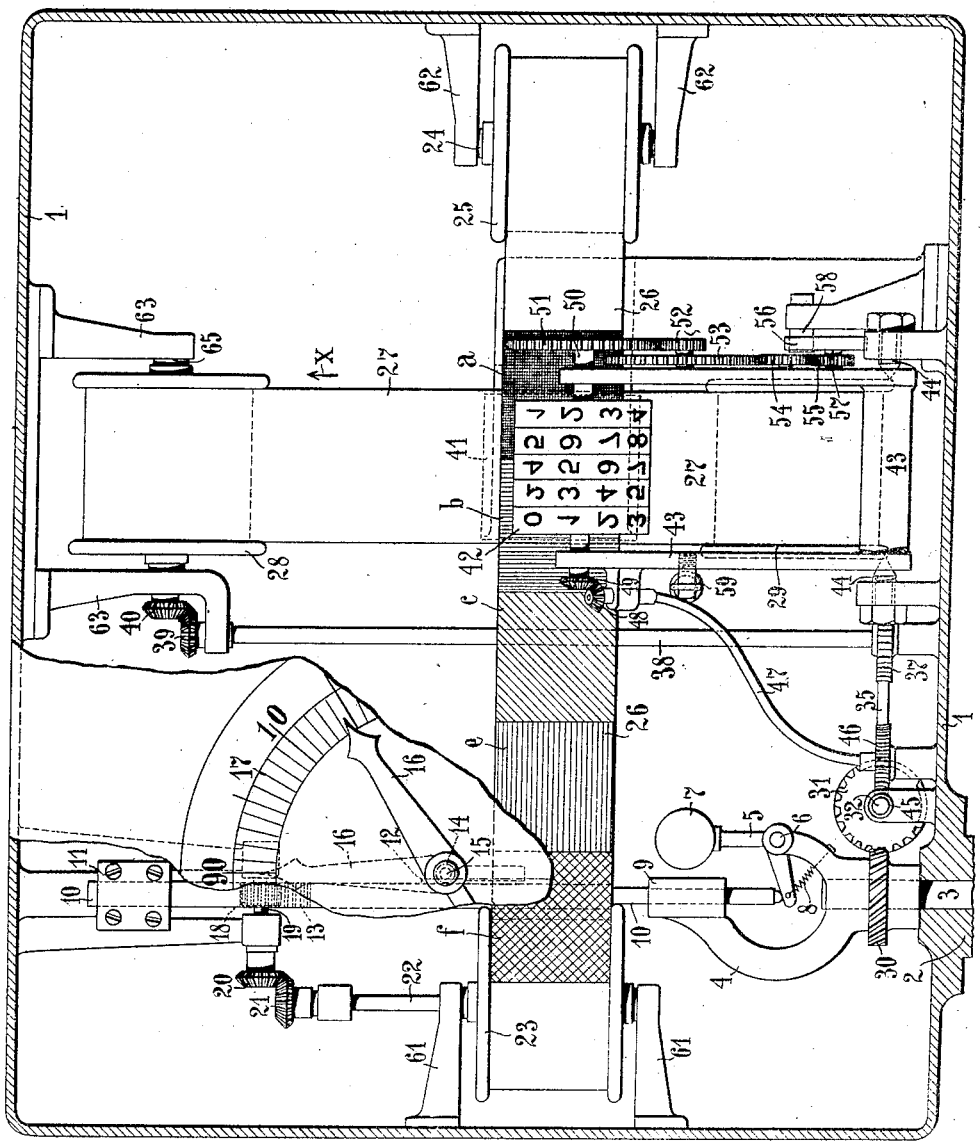

A. E. C. DECKERT.
APPARATUS FOR RECORDING SPEEDS OF VEHICLES.
APPLICATION FILED AUG. 8, 1912.

1,054,398.

Patented Feb. 25, 1913.

3 SHEETS—SHEET 1.

A. E. C. DECKERT.
APPARATUS FOR RECORDING SPEEDS OF VEHICLES.
APPLICATION FILED AUG. 8, 1912.

1,054,398.

Patented Feb. 25, 1913.

3 SHEETS—SHEET 2.

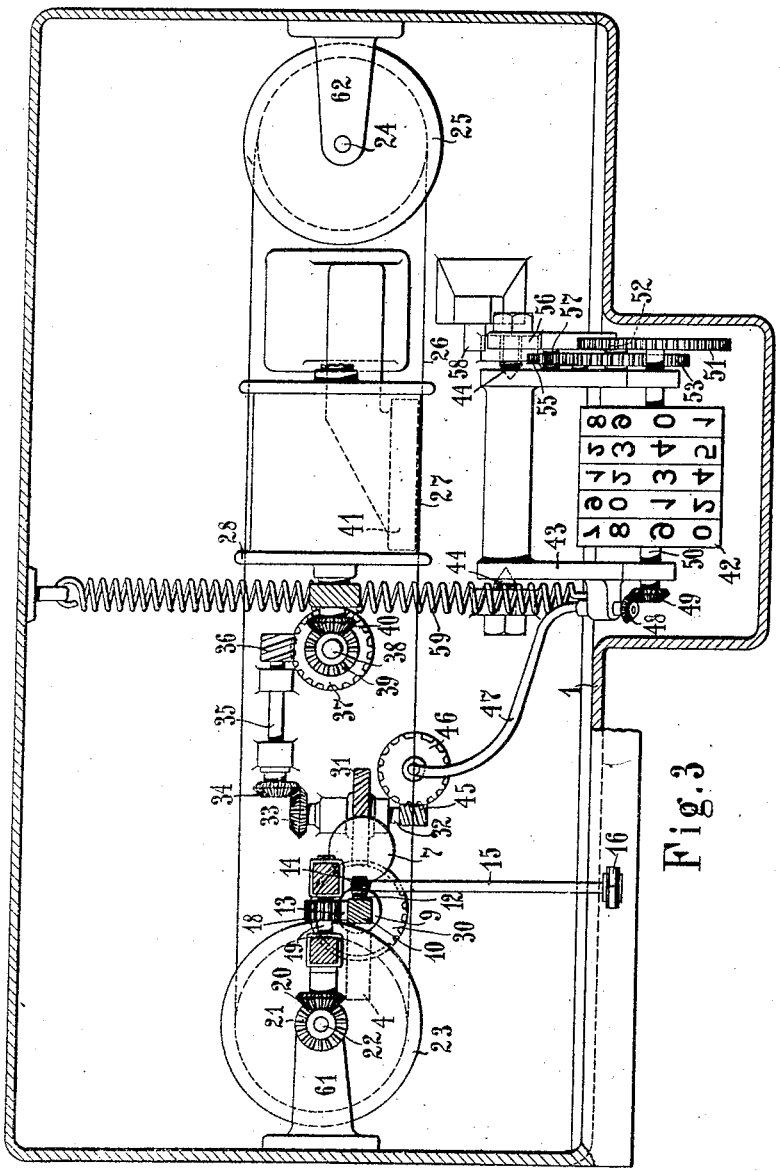

UNITED STATES PATENT OFFICE.

AUGUST ERNST CARL DECKERT, OF DRESDEN, GERMANY.

APPARATUS FOR RECORDING SPEEDS OF VEHICLES.

1,054,398.

Specification of Letters Patent. Patented Feb. 25, 1913.

Application filed August 8, 1912. Serial No. 714,111.

*To all whom it may concern:*

Be it known that I, AUGUST ERNST CARL DECKERT, a citizen of the German Empire, and residing at Dresden, Germany, have invented certain new and useful Improvements in Apparatus for Recording Speeds of Vehicles, of which the following is a specification.

My invention relates to apparatus for recording the speeds of vehicles, and a primary object is to provide a speed indicator in combination with a kilometer-counter which so coacts with an ink-ribbon of various colors that from time to time, e. g. from kilometer to kilometer, or at each fraction of a kilometer, a traveling paper strip has printed on it a record of the reading of the kilometer counter in a color which indicates the speed at that moment; in this way the speeds attained during a given time can always be determined.

Devices for automobiles and the like have already been proposed whose object is to enable the traveler, or some third person, e. g. a policeman, to ascertain at what speed the vehicle is traveling. For this purpose a plate has been employed having three horizontal fields or spaces of different colors, which was moved behind an aperture by a centrifugal device driven by the wheel of the vehicle, it being thus possible to determine from the color appearing at the aperture approximately at what speed the vehicle was traveling at any time. In addition, a kilometer-counter which at certain time-intervals prints a record of its reading on a paper strip, is also known.

The apparatus according to my invention differs from the above devices in that I employ in combination with the printing kilometer-counter, an ink-ribbon having variously colored subdivisions, spaces or fields, so that the readings of the counter are from time to time printed on a paper-strip in that color of the ribbon which corresponds to the speed of the vehicle at the time. As the records are printed behind an aperture, the traveler can ascertain from each record the speed of the vehicle. The various colors of the ribbon, e. g. black, blue, green, red, yellow, correspond to various speeds, e. g. 0, 5, 25, 50, 75, 100 kilometers. The ribbon runs over two spools, and the kilometer-counter of a form known in itself is so arranged that its raised figures serve as printing type and are caused by a suitable device to strike the ribbon onto the record strip at each kilometer traveled, or at each predetermined fraction of a kilometer. This record strip is not driven by clockwork, but is fed a certain distance by the mechanism of the speed-counter itself at each kilometer or fraction thereof which is traveled. The ink-ribbon, however, is operatively connected with the mechanism of the speed-indicator and is thus fed correspondingly.

One illustrative embodiment of my invention is represented by way of example in the accompanying drawings, wherein:—

Figure 2:
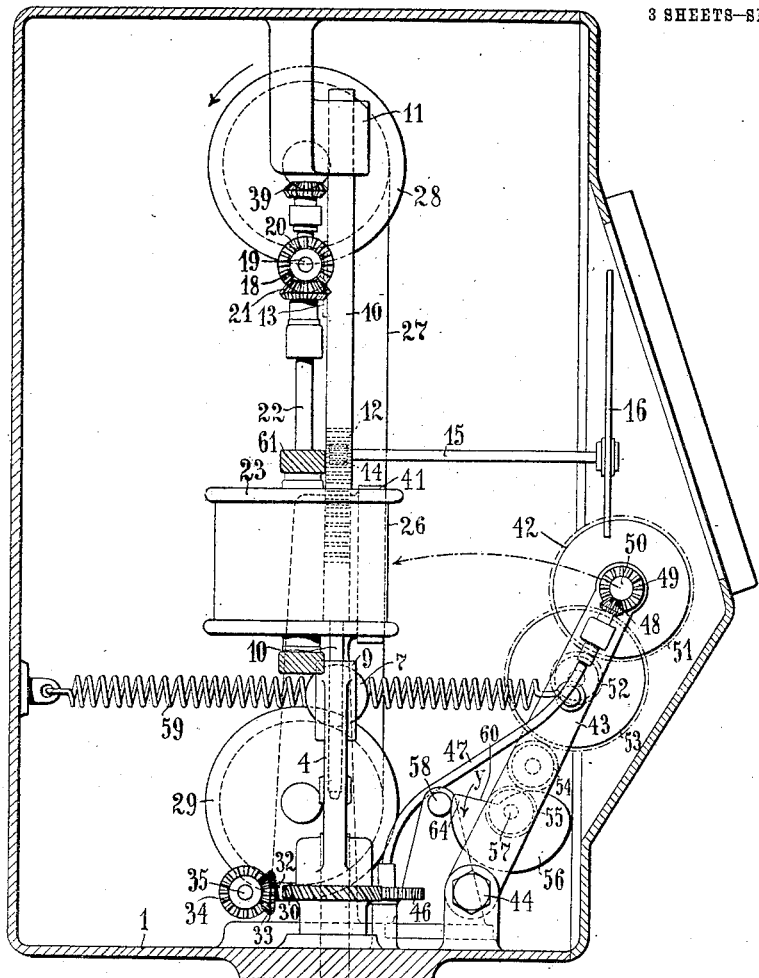

Figure 1 is a front elevation, partly in section, showing a preferred construction of my speed recorder, Fig. 2 is a vertical cross-section, Fig. 3 a horizontal section, and Figs. 4 to 6 show the records as printed.

Referring to the drawings, a spindle 3, journaled in the downward projection 2 of the casing 1, is operatively connected with the wheel of the vehicle in such manner that it rotates synchronously therewith. The upper end of the spindle 3 carries a yoke 4, in one of whose arms is journaled the pin 6 carrying the centrifugal lever 5. One arm of this lever holds the centrifugal ball 7, and the other is subjected to the action of a spring 8. The upper end of the other arm of the yoke 4 has a guide 9, in which slides one end of a rod 10, of square or polygonal section, whose other end is movable in the bearing 11 fast on the casing 1. The rod 10 contains at different heights two racks 12, 13, the former meshing with a pinion 14 fast on the axle 15 carrying the pointer 16. This pointer moves over a scale 17 and thus indicates to the driver of the vehicle the speed at each moment. The other rack 13 meshes with a pinion 18 fast on the axle 19, and the motion of the latter is transmitted by bevel-gears 20, 21 to the axle 22 carrying the spool 23. The axle 22 is journaled in bearings 61 fast on the casing 1. On the side of the casing opposite these bearings and at the same height are the bearings 62, in which is journaled the axle 24 carrying the spool 25. Looped around the two spools 23, 25 is an endless ribbon 26 which is provided with several variously colored subdivisions, squares or fields. In the illustrative embodiment *a* designates a black field, *b* a blue field, *c* a green field, *e* a red field and *f* a yellow field. It will be understood that, when still higher speeds are to be recorded, the number of these fields can be increased as desired.

The ink-ribbon 26 is driven by the spindle 3 through the medium of the gearing just described and moves to and fro in accordance with the changes in the speed. At right-angles to this ink-ribbon is a paper strip 27 which moves in front of the plate 41 and is wound on the two spools 28, 29. The spool 28 is driven by the spindle 3 in the following manner: Fast on the yoke 4, i. e. on the spindle 3, is a spiral gear 30, engaging in a similar gear 31 fast on an axle 32. The bevel-gears 33, 34 transmit the motion of the axle 32 to an axle 35 which carries a worm 36 engaging in a worm-wheel 37; the vertical axle 38 carrying the latter transmits its motion by means of the bevel-gears 39, 40 to the axle 65 which is journaled in the bearings 63, fast on the casing, and carries the spool 28. The paper-strip 27 is therefore driven at a speed proportional to the rotational speed of the spindle 3 or the yoke 4, and, moving in the direction of th arrow $x$ is wound off from the spool 29 onto the spool 28. Behind the place where the ink-ribbon 26 crosses the paper-strip 27 is fixed the plate 41, and in front of this crossing-place there is arranged the kilometer-counter 42 which, at certain time-intervals, is pressed against the plate 41 and records the reading of the counter at that moment. The axle 50 of the kilometer-counter 42 is journaled in the upper end of a frame 43 (Fig. 3) whose lower end is carried by pointed pivot-screws 44. The counter 42 is driven by means of the worm 45 fast on the shaft 32, the motion being transmitted to the axle 50 of the counter by the worm-wheel 46, a flexible shaft 47 and the bevel-gears 48, 49. In one side of the frame 43 are journaled the various wheels 51, 52, 53, 54 and 55, meshing one with another, the last of these being fast on an axle 57 carrying a cam 56. A spring 59 tends to pull the frame 43, and with it the counter 42, toward the left (Fig. 2), so that the cam 56 bears against a stationary pin 58 and, when rotating, rolls on it in the direction shown by the arrow $y$ in Fig. 2. As soon as the shoulder 64 of the cam has passed the pin 58, the recessed portion 60 of this cam allows the spring 59 to rock the frame 43 to the left and to bring the counter 42 against the plate 41 for recording the reading of the counter. When the cam is rotated further, it returns the counter 42 away from the plate 41.

The reading of the kilometer-counter is printed in that color of the band 26 which corresponds to the speed at that moment. When the vehicle is at rest the numbers on the kilometer-counter are exactly opposite the first color on the ribbon, e. g. black. When the vehicle starts, however, it operates the speed-indicating mechanism which, by moving the ribbon, brings in front of the kilometer-counter in turn the blue, green, red and finally the yellow color, and the record strip accordingly becomes printed in a color corresponding to the speed.

The kilometer-counter may be arranged for recording numbers having 3, 4, 5 or more digits. The length of each colored division of the ribbon exactly corresponds with the total width occupied by the numbers on the counter, and the total width of the numbers on the counter, and hence the length of one color of the ribbon, is made to correspond to a speed which is as many times 5 kilometers as there are digits in one number on the counter, that is to say the width of one digit on the counter corresponds to 5 kilometers. The ribbon can move from left to right or reversely according to the movement of the speed-indicating pointer. When this motion is from left to right and the first digit on the left of the counter, i. e. that having the highest value, is recorded entirely blue, a speed of 5 kms. obtains. When all the digits are recorded in blue, in the case of the 5 digits taken by way of example a speed of 5×5 km.=25 kms. is indicated. If, however, the first or highest digit on the left appears partly in blue and partly black, this indicates that the vehicle has not attained a speed of 5 kms., but only of the number of kilometers denoted by the blue points appearing above and below the digit, as shown in Figs. 4–6 in the accompanying drawings. When the counter records a number partly or wholly printed in the next color, i. e. green, it records that the vehicle has a speed of from 25 to 50 kilometers according as only a portion or the whole of the number appears in this color. Similarly, when the number is red, the speed is 75 kilometers, when yellow, 100 kilometers, and so on. Hence each number recorded also records, by its color, the speed at the time of the record.

I claim:—

1. In apparatus for recording the speeds of vehicles, the combination with a speed indicator driven by the vehicle, and a movably mounted kilometer-counter comprising digits formed as types, driven by the vehicle, of an ink-ribbon having a plurality of variously colored subdivisions driven longitudinally by the speed-indicator, a paper strip driven by the vehicle behind, in operative relation to, and transversely of the ink-ribbon, and means for intermittently driving the counter against the part of the ink-ribbon immediately in front of the paper strip and thereby simultaneously making a record on the paper strip in a color or colors corresponding to the speed of the vehicle.

2. In apparatus for recording the speed of vehicles, the combination with a centrifugal speed indicator driven by the vehicle, and a kilometer-counter mounted to rock comprising digits formed as types, driven by the vehicle, of an ink-ribbon having a plurality of variously colored subdivisions driven longitudinally by the speed indicator, a paper strip driven by the vehicle behind, in operative relation to, and transversely of the ink-ribbon, a spring tending to rock the counter against the part of the ink-ribbon immediately in front of the paper strip, and means driven by the counter for rocking the same against the action of the spring and suddenly releasing the same.

3. In apparatus for recording the speeds of vehicles, the combination of a casing, a shaft carrying a yoke journaled therein, a centrifugal lever fulcrumed in one arm of the yoke, a vertical rod having two toothed racks movable longitudinally in the other arm and bearing on said lever, a pointer geared with one of said toothed racks, two spools mounted on the sides of the casing, and an ink-ribbon divided into a plurality of squares of various colors carried by the spools, one of the spools being geared with the other toothed rack; two spools mounted on the top and bottom of the casing, a plate fixed in the casing behind the ribbon, and a paper strip carried by the latter spools and passing between the ribbon and the plate, one of the latter spools being driven by the shaft; a kilometer-counter driven by the shaft and mounted to rock in front of the part of the ribbon in front of the plate, a spring tending to rock the counter toward the plate, a pin fixed in the casing and a cam geared with the counter and rolling on the pin, the counter comprising disks having numbers formed as types.

In testimony whereof, I affix my signature in the presence of two witnesses.

AUGUST ERNST CARL DECKERT.

Witnesses:
PAUL ARRAS,
CLÄRE SIMON.